March 13, 1951     G. A. LYON     2,544,703
WHEEL COVER
Filed Dec. 12, 1947     2 Sheets-Sheet 1
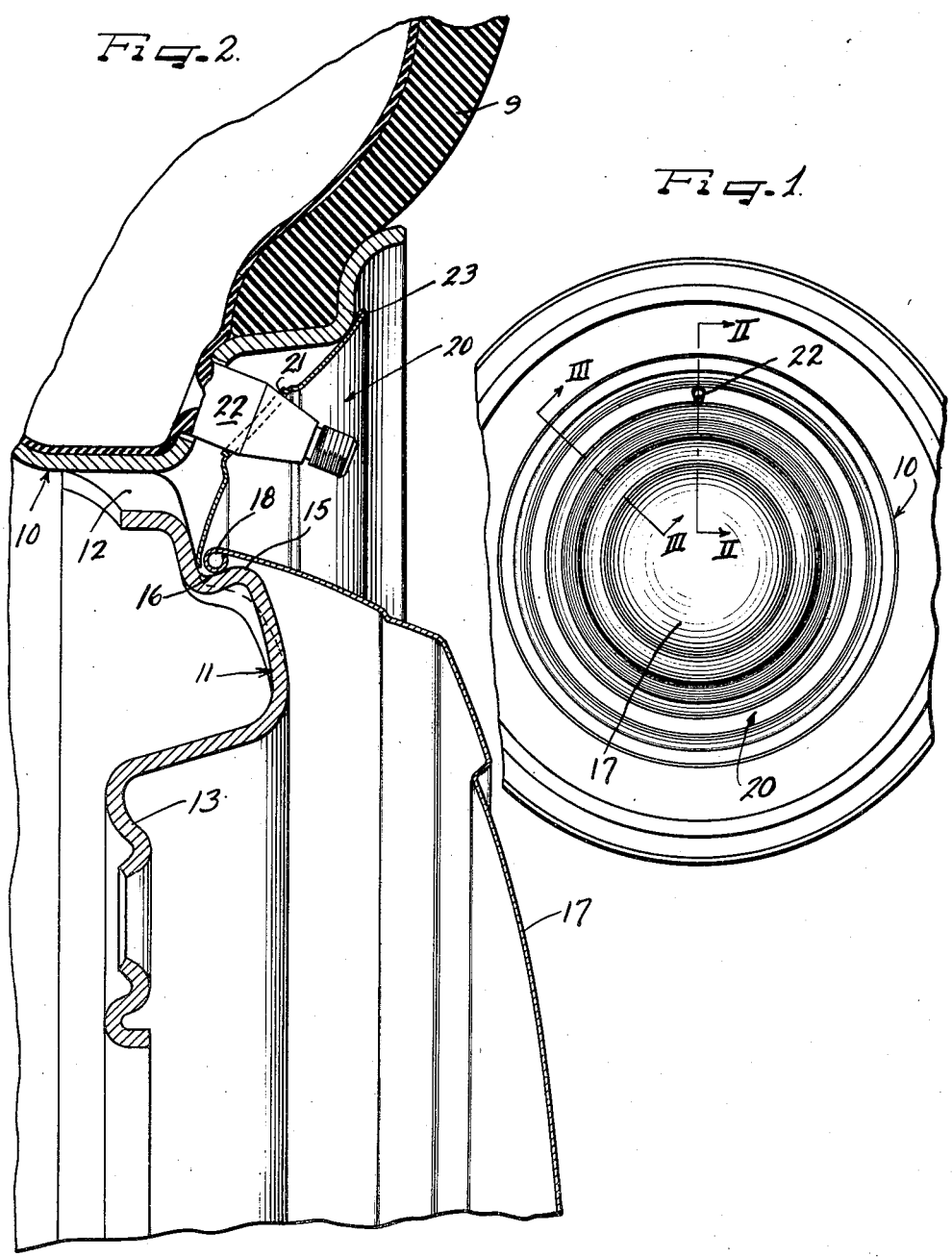
Inventor
GEORGE ALBERT LYON
by The Firm of Charles W. Hills
Attys.

March 13, 1951 G. A. LYON 2,544,703
WHEEL COVER
Filed Dec. 12, 1947 2 Sheets-Sheet 2
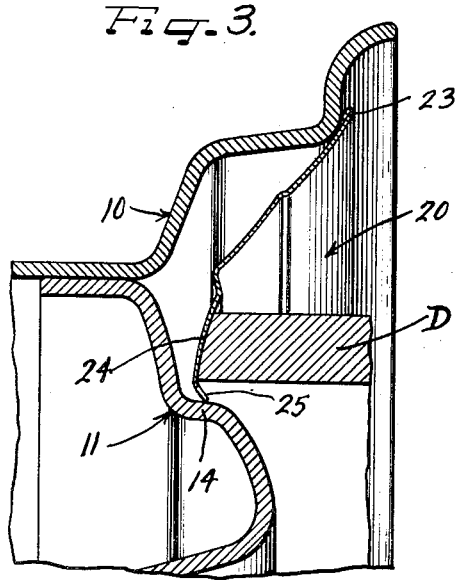
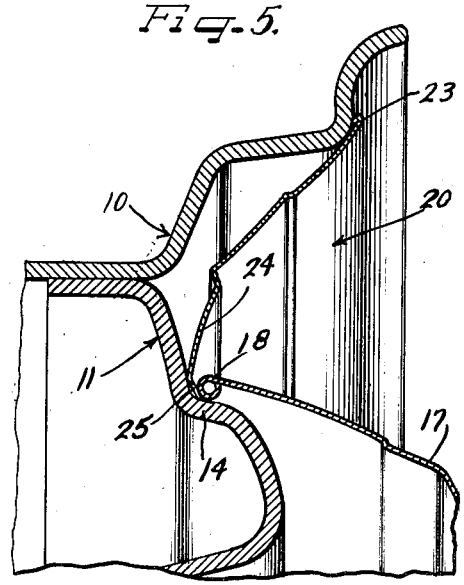
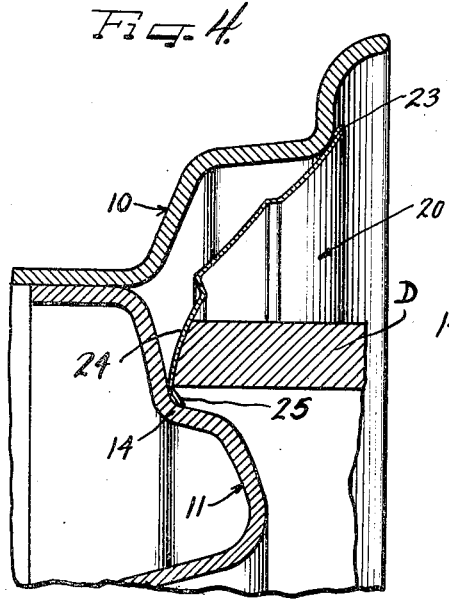
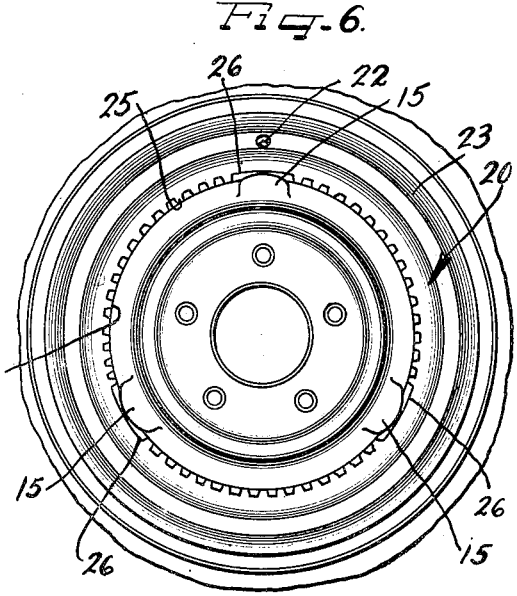
Inventor
GEORGE ALBERT LYON
The Firm of Charles W. Hills
by Attys.

Patented Mar. 13, 1951

2,544,703

UNITED STATES PATENT OFFICE 2,544,703

WHEEL COVER

George Albert Lyon, Detroit, Mich.

Application December 12, 1947, Serial No. 791,304

5 Claims. (Cl. 301—37)

This invention relates to ornamental wheel trim and more particularly to an annular trim ring which may be press fitted onto a wheel.

An object of this invention is to provide a very simple form of trim ring which can be either rolled or stamped, and which lends itself to being press fitted onto an automobile wheel.

Yet another object of this invention is to provide a simplified form of ornamental trim ring for automobile wheels which lends itself to economical manufacture on a large production basis.

A still further object of the invention is to provide a one-piece vehicle wheel trim element which does not require any means other than the material of the element in the fastening of the same to a wheel.

In accordance with the general features of this invention there is provided in a wheel structure, including a wheel having a flanged tire rim part and a wheel body part provided with an annular shoulder and cover retaining bumps projecting from and radially beyond the shoulder, an annular trim member of a diameter such as to extend radially beyond the shoulder and having a radially inner edge notched to pass freely over the bumps and with edge portions between the bumps formed into fingers for wedging and retaining engagement with the shoulder on the body part.

Still another feature of the invention relates to the inclination of the retaining fingers on the inner edge of the trim so that the same may be easily forced by a simple press operation into wedged engagement with the shoulder on the wheel body part.

Other objects and features of this invention will more fully appear from the following detailed description taken in connection with the accompanying drawings which illustrate a single embodiment thereof and in which Figure 1 is a side view partly broken away of a wheel structure having a trim ring embracing the features of this invention;

Figure 2 is an enlarged fragmentary cross-sectional view taken on substantially the line II—II of Figure 1 looking in the direction indicated by the arrows;

Figure 3 is an enlarged fragmentary cross sectional view taken on substantially the line III—III of Figure 1 looking in the direction indicated by the arrows, but showing the trim ring in the process of being pressed home against the wheel shoulder by a die member illustrated in section;

Figure 4 is a sectional view similar to Figure 3 but showing the retaining fingers on the trim ring pressed tightly against the wheel body shoulder part by the die member;

Figure 5 is a sectional view similar to Figure 4 and showing the hub cap applied to the wheel body; and Figure 6 is a fragmentary front view of the structure shown in Figure 2 with the hub cap omitted so as to show how the wheel bumps alternate with the retaining fingers on the trim ring.

As shown on the drawings:

In the accompanying drawings I have illustrated a wheel of the type that is now being used on some of the cars and which is covered in other copending applications of myself, including application, Serial No. 618,825, filed September 27, 1945, now matured into Patent Number 2,445,330, issued July 20, 1948.

I shall, therefore, only refer to such portions of this wheel as are necessary to show the interrelationship of the same with my novel trim ring which is different from the trim ring of my aforesaid copending application.

The reference character 9 designates generally a pneumatic tire and tube assembly mounted on the usual multi-flanged drop center type of tire rim part which is in turn carried by the wheel body part 11. The wheel body part is attached at spaced intervals to the bottom or base of the rim part leaving the usual spaced wheel openings 12. The central portion of the body part 11 is dished to provide a radially extending bolt-on flange 13, which may be attached in the usual way by conventional bolts or cap screws (not shown) to the axle of the vehicle.

The body part 11 is provided with an annular shoulder 14 from which is depressed at spaced intervals a series of inclined hub cap bumps or protuberances 15, which may be of any suitable number, such, for example, as three to five. As will be noted from Figure 2, the base or innermost portion 16 of the edge bump is disposed radially beyond the normal outer surface of the shoulder 14.

Detachably cooperable with the bumps 15 is a sheet metal wheel cover or hub cap 17 having an inner turned or curled edge 18 adapted to be stretched over the bumps 15. In the application of the cover 17 the edge 18 is flexed at the bumps radially outwardly and the portions of the edge 18 between the bumps are flexed radially inwardly toward the shoulder 14 which is of a lesser diameter than the bases 16 of the bumps. This insures a tight retaining cooperation of the hub cap with the wheel body.

Now my invention is particularly concerned with the provision of a trim ring 20 which can be permanently retained on the wheel even after the hub cap or wheel cover 17 is removed. This trim ring may be made of any suitable metal sheet material. Excellent results may be obtained by making it of stainless steel or the like. The ring lends itself to economical manufacture by rolling it from strip stock or by blanking it from sheet stock. In the event it is blanked from sheet stock the blanked out center portion can be used in the fabrication of other parts, such as hub caps or the like.

The trim ring 20 is generally of a dished or concave configuration and includes an opening 21 for the usual valve stem 22 of the tire assembly 9 to project therethrough. The outer edge 23 of this trim ring may, if it is so desired, terminate short of the adjoining edge of the tire rim part but is designed to bear against an outer portion or flange of the tire rim part when the ring is mounted on the wheel. The extent to which the edge 23 projects radially outwardly is a matter of design, but I find it preferable to keep it at least inside of the outermost edge of the tire rim so as to preclude it from coming into contact with curbs or the like.

This invention is particularly concerned with the manner in which the inner peripheral portion of the ring is formed and attached to the wheel, as best illustrated in Figures 3 to 6. As shown in Figures 3 to 5, the ring may be provided with a plurality of concentric annular sections including a radially inner section 24 terminating in a series of angular or outwardly inclined teeth 25. It will be perceived from Figure 6 that sections of the inner edge of portion 24 are notched out at 26 so as to enable the edge to clear the spaced bumps 15 without interference with the bumps.

The innermost extremities of fingers 25 are of a diameter slightly greater than the outermost diameter of the shoulder 14 so as to require pressure in order for them to be pressed or deflected into wedged cooperation with the shoulder. This forcing of the fingers home may be effected by a simple press operation in which a die element D, shown diagrammatically in Figures 3 and 4, drives the portion 24 toward the body part 11, forcing the fingers 25 from the position shown in Figure 3 to the wedged position shown in Figure 4.

It should be noted that before applying the ring 20 to the wheel, the opening 21 must be aligned with the valve stem so that the valve stem can project through the ring. Thereafter the press element D strikes the annular cover portion 24, forcing the fingers 25 home, as described. When thus secured to the wheel, the ring in reality becomes a permanent part of the wheel and the fingers 25 will be normally concealed by the rolled edge of the hub cap 18 overlapping the same, as shown in Figure 5. Needless to say the ring 20 may be given any desired external finish or polish.

The stepped configuration of the ring 20 rigidifies the ring and enhances its ability to resist distortion when being pressed against the wheel. In addition, the stepped inner portion may be made of such depth as to form a seat for the die part D in the pressing of the ring against the wheel.

I claim as my invention:

1. In a wheel structure having a flanged tire rim part and a wheel body part provided with an annular shoulder and cover retaining bumps projecting from and radially beyond said shoulder, an annular trim ring for disposition over at least a portion of exposed flanges of the tire rim part radially beyond the shoulder and having its inner peripheral edge notched to clear and fit over the bumps and with portions of the edge between the bumps provided with retaining fingers wedged into engagement with said shoulder.

2. In a wheel structure having a flanged tire rim part and a wheel body part provided with an annular shoulder and cover retaining bumps projecting from and radially beyond said shoulder, an annular trim ring for disposition over at least a portion of exposed flanges of the tire rim part radially beyond the shoulder and having its inner peripheral edge notched to clear and fit over the bumps and with portions of the edge between the bumps provided with retaining fingers wedged into engagement with said shoulder, said fingers being inclined radially inwardly and axially outwardly and having a press fit engagement with said shoulder.

3. In a wheel structure having a flanged tire rim part and a wheel body part provided with an annular shoulder and cover retaining bumps projecting from and radially beyond said shoulder, an annular trim ring for disposition over at least a portion of exposed flanges of the tire rim part radially beyond the shoulder and having its inner peripheral edge notched to clear and fit over the bumps and with portions of the edge between the bumps provided with retaining fingers wedged into engagement with said shoulder, the outer edge portion of said ring engaging a flange of said tire rim part when the fingers on the inner edge of the ring are forced home against said shoulder.

4. In a wheel structure having a flanged tire rim part and a wheel body part provided with an annular shoulder and cover retaining bumps projecting from and radially beyond said shoulder, an annular trim ring for disposition over at least a portion of exposed flanges of the tire rim part radially beyond the shoulder and having its inner peripheral edge notched to clear and fit over the bumps and with portions of the edge between the bumps provided with retaining fingers wedged into engagement with said shoulder, said trim ring having an intermediate annular inset section joined to the remaining radially inner and outer sections of the trim ring by concentric shouldered portions for reinforcing the same and for resisting buckling in the pressing of the ring home into retained cooperation with the wheel.

5. In a wheel structure having a flanged tire rim part and a wheel body part provided with an annular shoulder and cover retaining bumps projecting from and radially beyond said shoulder, an annular trim ring for disposition over at least a portion of exposed flanges of the tire rim part radially beyond the shoulder and having its inner peripheral edge notched to clear and fit over the bumps and with portions of the edge between the bumps provided with retaining fingers wedged into engagement with said shoulder, and a hub cap retainingly engaging said bumps and concealing said notched trim ring edge and said retaining fingers.

GEORGE ALBERT LYON.

REFERENCES CITED

The following references are of record in the file of this patent:

UNITED STATES PATENTS

| Number | Name | Date |
|---|---|---|
| Re. 19,467 | Lyon | Feb. 12, 1935 |
| 2,214,746 | Lyon | Sept. 17, 1940 |
| 2,263,243 | Lyon | Nov. 18, 1941 |